United States Patent
Hagihara et al.

(10) Patent No.: US 11,087,238 B2
(45) Date of Patent: Aug. 10, 2021

(54) THERMAL DISPLACEMENT COMPENSATION DEVICE

(71) Applicant: FANUC Corporation, Yamanashi (JP)

(72) Inventors: Kei Hagihara, Yamanashi (JP); Yoshito Miyazaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 293 days.

(21) Appl. No.: 16/393,961

(22) Filed: Apr. 25, 2019

(65) Prior Publication Data
US 2019/0354892 A1    Nov. 21, 2019

(30) Foreign Application Priority Data

May 16, 2018    (JP) .............................. JP2018-094752

(51) Int. Cl.
*G06N 20/00*    (2019.01)
*G05B 19/404*    (2006.01)

(52) U.S. Cl.
CPC ........... *G06N 20/00* (2019.01); *G05B 19/404* (2013.01); *G05B 2219/49206* (2013.01)

(58) Field of Classification Search
None
See application file for complete search history.

(56) References Cited

U.S. PATENT DOCUMENTS

| 2017/0090428 A1* | 3/2017 | Oohara | .................... G06N 3/08 |
| 2017/0372229 A1* | 12/2017 | Ura | ........................ G06N 20/00 |
| 2018/0107947 A1 | 4/2018 | Ogawa | |
| 2018/0356282 A1 | 12/2018 | Fukuda et al. | |
| 2019/0099849 A1 | 4/2019 | Hada et al. | |
| 2019/0099850 A1 | 4/2019 | Hada et al. | |

FOREIGN PATENT DOCUMENTS

| CN | 103926874 A | 7/2014 |
| CN | 107953144 A | 4/2018 |
| JP | H1074188 A | 3/1998 |
| JP | 2003-94291 A | 4/2003 |
| JP | 200655918 A | 3/2006 |
| JP | 2011-131371 A | 7/2011 |
| JP | 2017120622 A | 7/2017 |
| JP | 201963959 A | 4/2019 |
| JP | 201963960 A | 4/2019 |

\* cited by examiner

*Primary Examiner* — Mohammad Ali
*Assistant Examiner* — Saad M Kabir
(74) *Attorney, Agent, or Firm* — Hauptman Ham, LLP

(57) ABSTRACT

A machine learning device includes a model data selection unit to select, under a change in ambient temperature of a manufacturing machine, a learned model for additional learning of a thermal displacement compensation amount in each axis included in the manufacturing machine with respect to an operation state of the manufacturing machine, and a learned model storage unit to associate and store a pattern of an ambient temperature change curve indicating a transition of a change in the ambient temperature of the manufacturing machine and the learned model that is learned under the change in the ambient temperature. Based on the ambient temperature change curve stored in the learned model storage unit, the model data selection unit selects a learned model suitable for the additional learning of the thermal displacement compensation amount in each axis included in the manufacturing machine with respect to the operation state of the manufacturing machine.

3 Claims, 3 Drawing Sheets

THERMAL DISPLACEMENT COMPENSATION DEVICE

RELATED APPLICATION

The present application claims priority to Japanese Application Number 2018-094752 filed May 16, 2018, the disclosure of which is hereby incorporated by reference herein in its entirety.

BACKGROUND OF THE INVENTION

Field of the Invention

The present invention relates to a thermal displacement compensation device having a temperature compensation function for machine accuracy.

Description of the Related Art

Thermal displacement of a manufacturing machine such as a machining tool is one of disturbance factors of processing accuracy. When considered, a heat source of a manufacturing machine is briefly separated into two that are (1) an internal heat source generated along with operation of the manufacturing machine, and (2) an external heat source that has an effect in an installation environment of the manufacturing machine. Among these, an atmosphere factor such as a temperature change or hot air/cool air, and heat radiation of sunlight, illumination, or the like are considered as external heat sources. When processing is performed by a manufacturing machine, it is necessary to compensate thermal displacement due to a temperature change in consideration of these internal heat source and external heat source in order to secure machine accuracy.

A technology of reducing an effect of thermal displacement by predicting a thermal displacement amount due to a temperature change based on such heat sources and compensating a feeding amount in each coordinate axis direction has been widely known in a related art. However, it is difficult to accurately predict a thermal displacement amount due to a temperature change in a manufacturing machine, and there is a limit in compensation of thermal displacement by compensation of a feeding amount in each coordinate axis direction.

As a technology in a related art to solve such a problem, for example, a technology of introducing a plurality of temperature sensors, calculating usefulness of each temperature sensor, selecting a used temperature sensor, and compensating thermal displacement of a machining tool by using a value measured by the selected temperature sensor is disclosed in Japanese Patent Application Laid-Open No. 2011-131311. Also, in Japanese Patent Application Laid-Open No. 2003-094291, a technology of calculating thermal displacement of a machining tool by a relational expression using a neural network, and eliminating an effect of the thermal displacement by compensating a position of each movable unit is disclosed.

However, temperature compensation for machine accuracy of a manufacturing machine by machine learning seen in Japanese Patent Application Laid-Open No. 2003-094291 or the like has a problem of being vulnerable to a change in an installation condition of a manufacturing machine. Even in a case of an operation in the same manufacturing machine, it is not possible to correctly perform thermal displacement compensation when a learned model is used as it is, and additional learning by a machine learning device becomes necessary in a case where the manufacturing machine is installed in a place with a different ambient temperature environment. In a case where a manufacturing machine is operated in a factory, layout replacement of the manufacturing machine is performed frequently. Thus, it is not efficient when additional learning becomes necessary each time.

SUMMARY OF THE INVENTION

Thus, an embodiment of the present invention is to provide a thermal displacement compensation device that makes it possible to efficiently perform temperature compensation for machine accuracy in an environment in which a surrounding condition is unknown.

In the thermal displacement compensation device of the embodiment of the present invention, machine learning in an isothermal ambient temperature environment is performed as basic data, and an inference equation or a neural network after the learning is he Then, when a manufacturing machine is installed in an actual operation environment and additional learning is performed, a change in a temperature of an ambient temperature environment is also logged, and an average value and a variance value in a temperature change curve in one day are held as labels of learned data. Then, data is recorded and accumulated at each time of layout replacement. In a case where the manufacturing machine is installed in an unknown ambient temperature environment, a learned model that is learned in an ambient temperature environment having a relatively similar tendency in a temperature change curve in one day is selected from the data accumulated in the past and additional learning is started.

In such a manner, by performing additional learning based on a learned model that is learned in an ambient temperature environment having a similar tendency in a temperature change curve, it is possible to greatly reduce time necessary for the additional learning.

Then, an aspect of the present invention is a thermal displacement compensation device to estimate a thermal displacement compensation amount in each axis included in a manufacturing machine, the device including: a machine learning device configured to learn a thermal displacement compensation amount in each axis included in the manufacturing machine with respect to an operation state of the manufacturing machine, wherein the machine learning device includes a model data selection unit configured to select, under a change in ambient temperature of the manufacturing machine, a learned model suitable for additional learning of the thermal displacement compensation amount in each axis included in the manufacturing machine with respect to the operation state of the manufacturing machine, and a learned model storage unit that associates and stores a pattern of an ambient temperature change curve indicating a transition of the change in the ambient temperature of the manufacturing machine, and a learned model that is learned under the change in the ambient temperature, and the model data selection unit selects the learned model suitable for the additional learning of the thermal displacement compensation amount in each axis included in the manufacturing machine with respect to the operation state of the manufacturing machine based on the ambient temperature change curve stored in the learned model storage unit.

According to an embodiment of the present invention, it becomes possible to reduce time necessary for additional learning in a layout change by properly using a learned model learned in various kinds of ambient temperature environment.

BRIEF DESCRIPTION OF THE DRAWINGS

The above-described and the other objects and characteristics of the present invention will become obvious from the following description of embodiments with reference to the attached drawings. Among these drawings.

DETAILED DESCRIPTION OF THE PREFERRED EMBODIMENTS

In the following, embodiments of the present invention will be described with reference to the drawings.

Figure 1:
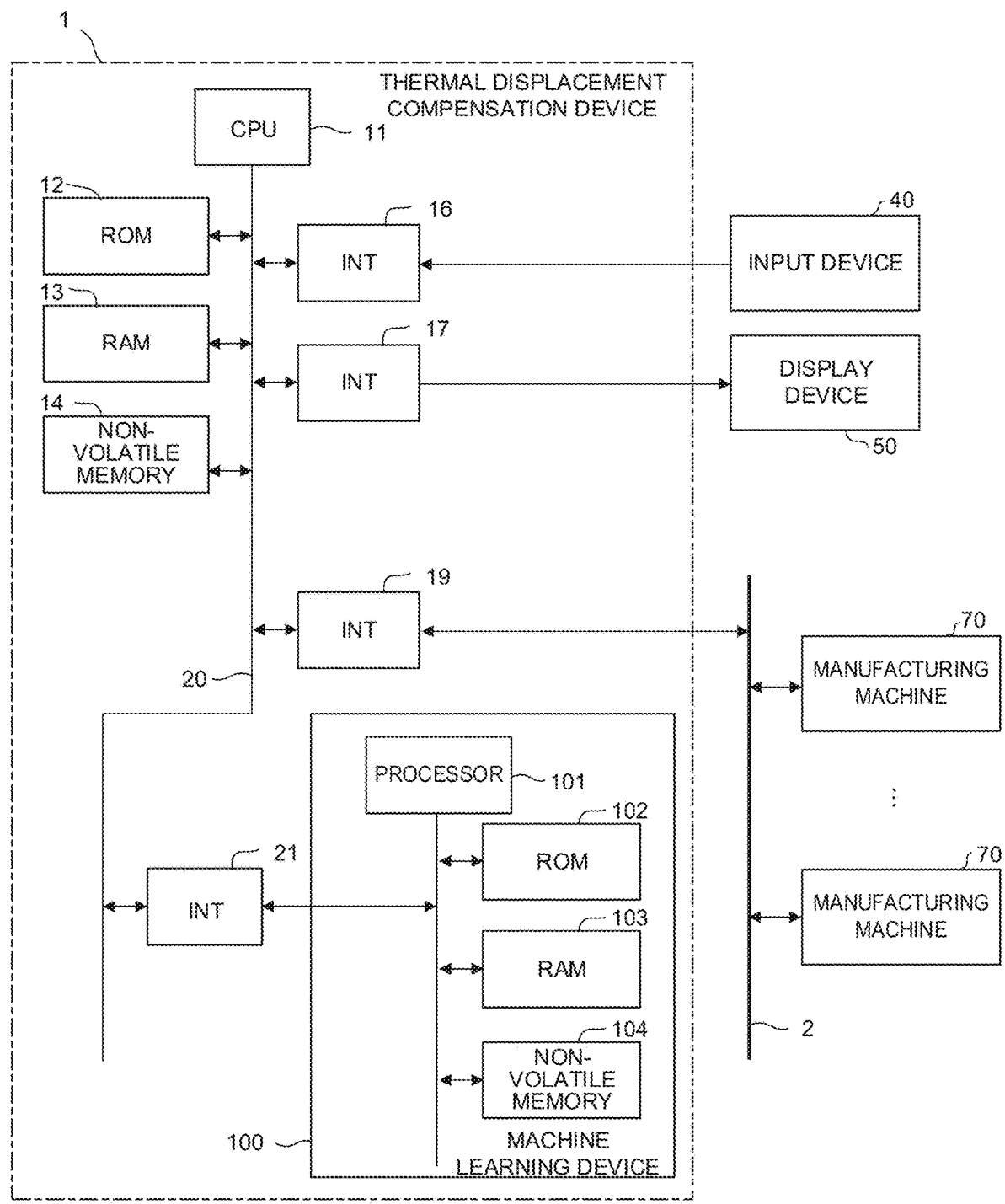
FIG. 1 is a schematic hardware configuration view of a thermal displacement compensation device according to an embodiment.

FIG. 1 is a schematic hardware configuration view illustrating a main part of a thermal displacement compensation device according to an embodiment of the present invention. A thermal displacement compensation device 1 can be mounted as a control device to control a manufacturing machine such as various processing machines or machining tools. Also, the thermal displacement compensation device 1 can be mounted as a computer such as a personal computer provided along with (control device to control) a manufacturing machine, a cell computer connected to (control device to control) a manufacturing machine through a network, a host computer, or a cloud server. In FIG. 1, an example of a case where the thermal displacement compensation device 1 is mounted as a computer connected to (control device to control) a manufacturing machine through a network is illustrated.

A CPU 11 included in the thermal displacement compensation device 1 according to the present embodiment is a processor that controls the thermal displacement compensation device 1 as a whole. The CPU 11 reads a system/program stored in a ROM 12 through a bus 20, and controls the whole thermal displacement compensation device 1 according to the system/program. In a RAM 13, temporary calculation data, various kinds of data input by an operator through an input unit (not illustrated), and the like are temporarily stored.

A non-volatile memory 14 is configured as a memory in which a storage state is held, for example, by backup by a battery (not illustrated) even when the power of the thermal displacement compensation device 1 is turned off. In the non-volatile memory 14, various kinds of data input by operation of an input device 40 by an operator, data acquired from a manufacturing machine 70 through an interface 19, a program input through an interface (not illustrated), and the like are stored. The program or various kinds of data stored in the non-volatile memory 14 may be extracted in the RAM 13 when being executed/used. Also, in the ROM 12, a system/program including a known analysis program to analyze information acquired from the manufacturing machine 70, a system/program to control communication with a machine learning device 100 (described later), or the like is previously written.

An interface 21 is an interface to connect the thermal displacement compensation device 1 and the machine learning device 100. The machine learning device 100 includes a processor 101 to control the whole machine learning device 100, a ROM 102 that stores a system/program or the like, a RAM 103 to perform temporary storing in each kind of processing according to machine learning, and a non-volatile memory 104 used for storage of a learning model or the like. The machine learning device 100 can observe various kinds of information that can be acquired by the thermal displacement compensation device 1 through the interface 21. Also, the thermal displacement compensation device 1 displays information related to a thermal displacement compensation amount output from the machine learning device 100 onto a display device 50 through an interface 17, or transmits the information related to a thermal displacement compensation amount to the manufacturing machine 70 through the interface 19.

Figure 2:
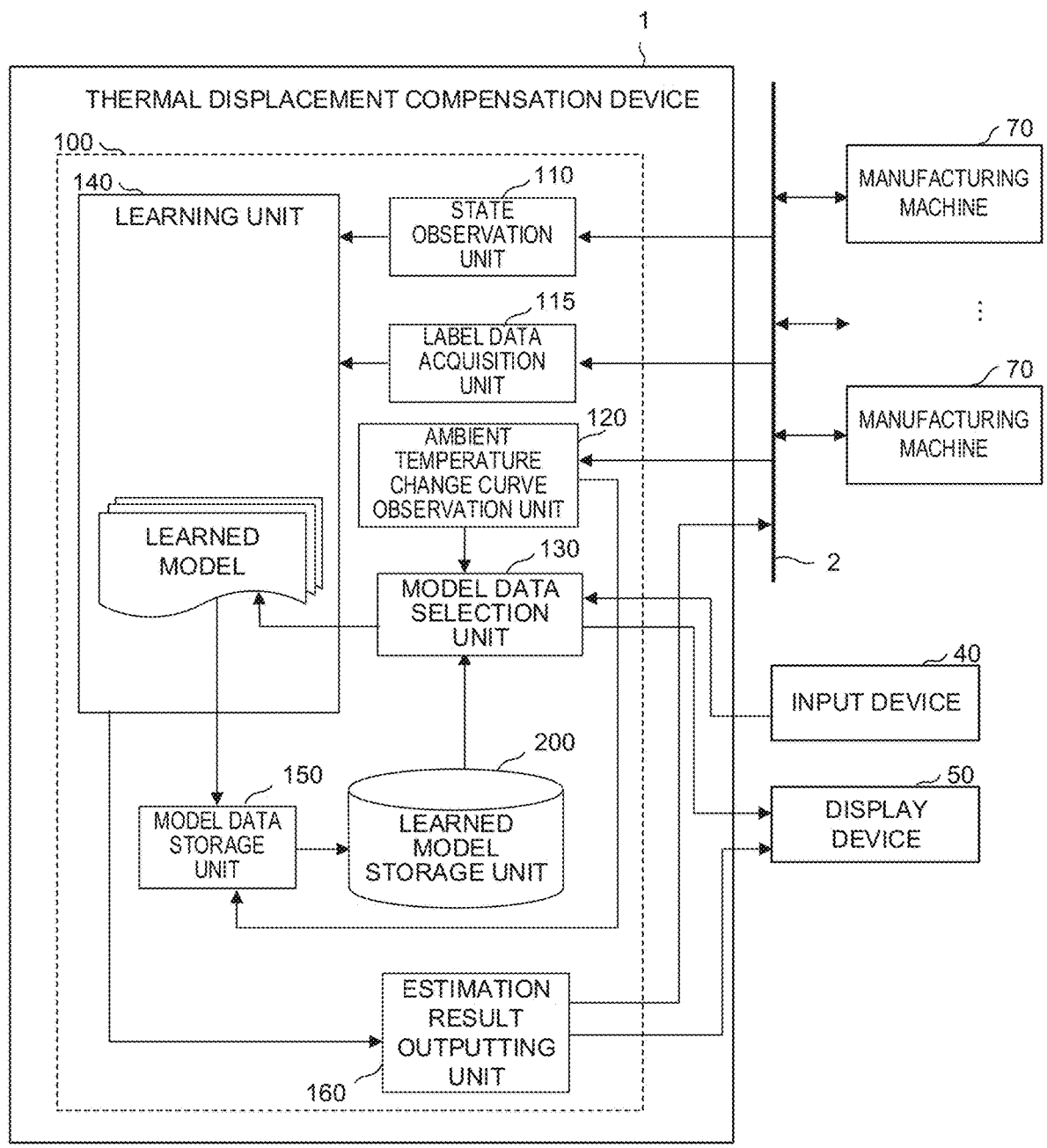
FIG. 2 is a schematic functional block diagram of the thermal displacement compensation device according to the embodiment.

FIG. 2 is a schematic functional block diagram of the thermal displacement compensation device 1 and the machine learning device 100 according to a first embodiment. Each functional block illustrated in FIG. 2 is realized when the CPU 11 included in the thermal displacement compensation device 1 illustrated in FIG. 1 and the processor 101 of the machine learning device 100 execute respective systems/programs and control an operation of each unit of the thermal displacement compensation device 1 and the machine learning device 100.

The thermal displacement compensation device 1 of the present embodiment causes the machine learning device 100 to observe information that is related to an ambient temperature change curve of each manufacturing machine 70 and that is acquired from the manufacturing machine 70 through a network 2 and information related to an operation state of the manufacturing machine 70, displays a thermal displacement compensation amount that is for compensation of thermal displacement generated in each manufacturing machine 70 and that is determined by utilization of a result of learning by the machine learning device 100 onto the display device 50, and performs transmission thereof to each manufacturing machine 70 through the network 2.

On the one hand, the machine learning device 100 included in the thermal displacement compensation device 1 includes a state observation hit 110 to perform observation as a state variable indicating a state of a working operation of each manufacturing machine 70, a label data acquisition unit 115 to acquire, as label data, a thermal displacement amount in each axis of the manufacturing machine 70 with respect to the state variable observed by the state observation unit 110, an ambient temperature change curve observation unit 120 to acquire information related to an ambient temperature change curve of each manufacturing machine 70 from the manufacturing machine 70, a model data selection unit 130 to select, as a learned model used in each manufacturing machine 70, a learned model suitable for learning of a thermal displacement compensation amount with respect to an operation state of the manufacturing machine 70 from a learned model storage unit 200 provided in the non-volatile memory 104 based on the information related to an ambient temperature change curve of each manufacturing machine 70 which curve is observed by the ambient temperature change curve observation unit 120, a learning unit 140 to perform machine learning of the learned model selected according to the ambient temperature change curve of each manufacturing machine 70 based on the state variable observed by the state observation unit 110 and the label data acquired by the label data acquisition unit 115, a model data storage unit 150 to store each learned model machine learning of which is performed by the learning unit 140 into he learned model storage unit 200, and an estimation result outputting unit 160 to infer and output a thermal displacement compensation amount with respect to the operation state of each manufacturing machine 70 based on a result of the learning by the learning unit 140.

The state observation unit 110 acquires, as a state variable, a state of a working operation of the manufacturing machine 70 which state is acquired from the manufacturing machine 70. As a state of the working operation of the manufacturing machine 70 which state is acquired by the state observation unit 110, for example, a current ambient temperature of the manufacturing machine 70, a temperature of each part of the manufacturing machine 70, and a speed, acceleration, or the of a motor of the manufacturing machine 70 are exemplified. For example, the state observation unit 110 may acquire a program for controlling the manufacturing machine 70 which program is executed in the manufacturing machine 70, a value of current flowing in the motor included in the manufacturing machine 70, or a detection value detected by a device such as a sensor separately provided in each unit of the manufacturing machine 70.

The label data acquisition unit 115 acquires, with respect to a state variable (state of working operation of manufacturing machine 70) observed by the state observation unit 110, label data (thermal displacement compensation amount in each axis of manufacturing machine 70 of when the state variable is observed). For example, the label data acquisition unit 115 can acquire, as label data with respect to a state variable, a value calculated based on a displacement amount in each axis which amount is measured by a measuring sensor or the like attached to each unit of the manufacturing machine 70 in processing of a work by the manufacturing machine 70. Also, for example, the label data acquisition unit 115 can acquire a value calculated based on a result of measurement of a work processed in the manufacturing machine 70 or a compensation value set by a worker as label data with respect to a state variable ex post facto.

The ambient temperature change curve observation unit 120 acquires an ambient temperature change curve of each manufacturing machine 70. For example, the ambient temperature change curve observation unit 120 acquires, as an ambient temperature change curve of the manufacturing machine 70, a temperature value detected by a temperature sensor installed in the manufacturing machine 70 or around the manufacturing machine 70. An ambient temperature change curve of the manufacturing machine 70 which curve is acquired by the ambient temperature change curve observation unit 120 Is data indicating a transition of a predetermined periodic a temperature change around the manufacturing machine 70. A temperature value detected by a single temperature sensor may be used as an ambient temperature change curve of the manufacturing machine 70 which curve is observed by the ambient temperature change curve observation unit 120. However, in order to further improve accuracy, an ambient temperature of the manufacturing machine 70 may be calculated by acquisition of a plurality of temperature values detected by a plurality of temperature sensors installed around the manufacturing machine 70, and performance of statistical processing (such as averaging) with respect to the plurality of temperature values, and a temporal transition of the calculated ambient temperature may be observed as an ambient temperature change curve.

The model data selection unit 130 selects, from learned models stored in the learned model storage unit 200, a learned model suitable for the ambient temperature change curve observed by the ambient temperature change curve observation unit 120. The learned model selected by the model data selection unit 130 is transmitted to the learning unit 140 as a learning model for additional learning and estimation in the manufacturing machine 70.

Figure 3:
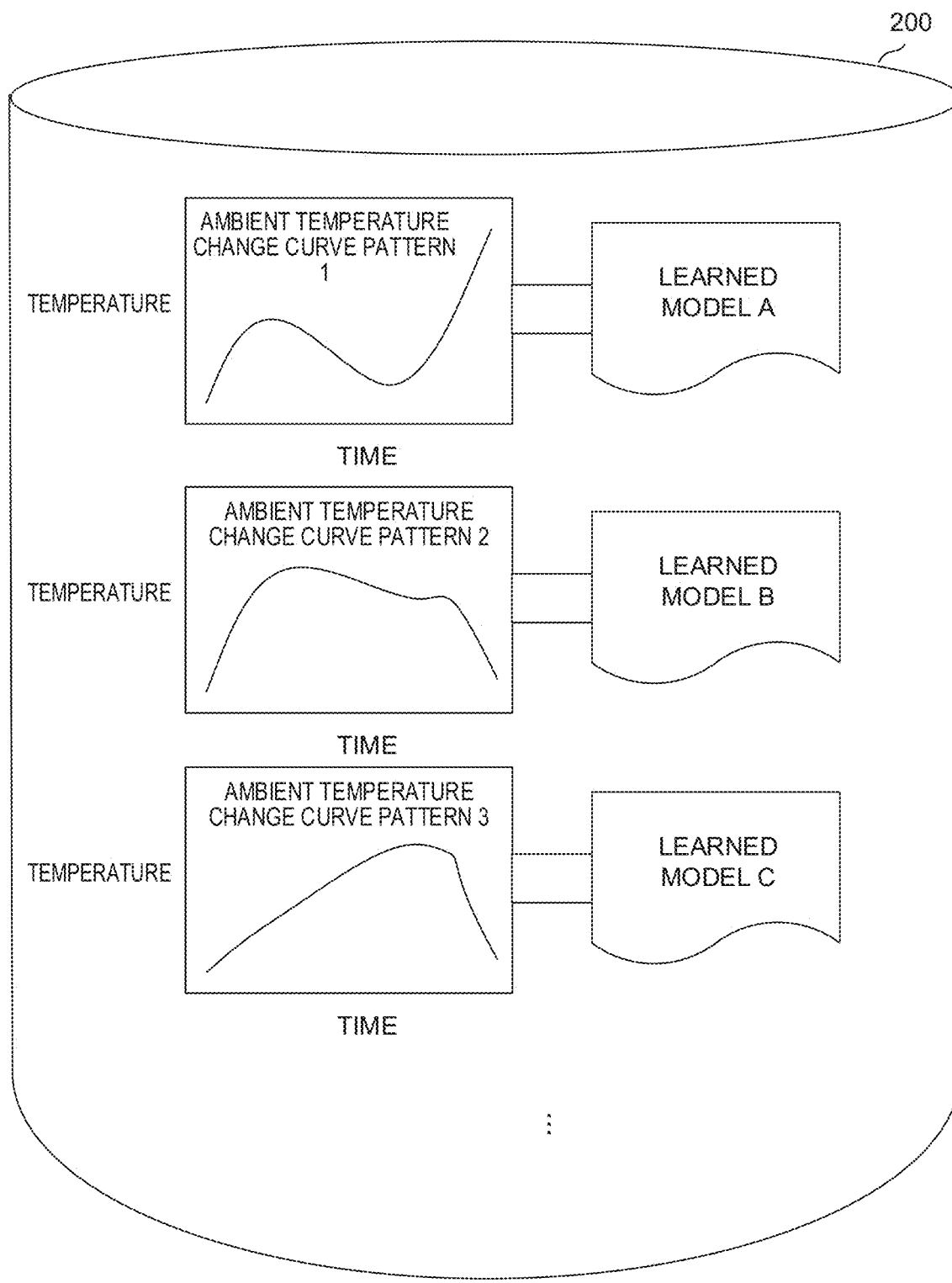
FIG. 3 is a view illustrating an example of an ambient temperature change curve and a learned model that are stored in a learned data storage unit.

FIG. 3 is a view illustrating an example of a learned model stored in the learned model storage unit 200. As exemplified in FIG. 3, for each learned model, a pattern of an ambient temperature change curve of the manufacturing machine 70 in which observation of a state variable used for learning of the learned model and acquisition of label data are performed is associated and stored in the learned model storage unit 200.

As a simple configuration, the model data selection unit 130 may display a list of an ambient temperature change curve associated to each learned model stored in the learned model storage unit 200 onto the display device 50, and make it possible for a worker to select n ambient temperature change curve similar to a transition of a change in ambient temperature in a current installation environment of the manufacturing machine 70 by operating the input device 40. In that case, each ambient temperature change curve may be displayed graphically and a statistic value such as an average value or variance value of each ambient temperature change curve may be displayed together to support selection. Also, the model data selection unit 130 may perform superposition display of an ambient temperature change curve observed from a manufacturing machine 70, which is an object of learned model selection, by the ambient temperature change curve observation unit 120 in a display form different from that of each ambient temperature change curve stored in the learned model storage unit 200 (such as solid line and dotted line, or line in different color) and may support a worker to determine similarity thereof.

Also, as more advanced mounting, for example, the model data selection unit 130 may perform wave pattern matching between an ambient temperature change curve of a manufacturing machine 70 which curve is observed by the ambient temperature change curve observation unit 120 after the manufacturing machine 70 is installed in a new environment and an ambient temperature change curve associated to each learned model stored in the learned model storage unit 200, and may select a learned model associated to an ambient temperature change curve pattern with the highest similarity as a learning model for learning and estimation of the manufacturing machine 70. In such a manner, it becomes possible to automatically select a learned model suitable for an installation environment of the manufacturing machine 70 without bothering a worker.

The learning unit 140 performs learning (additional learning) of a thermal displacement compensation amount in each axis included in each manufacturing machine 70 with respect to an operation state of the manufacturing machine 70 according to an arbitrary learning algorithm collectively called machine learning. Based on a state variable observed in the manufacturing machine 70 by the state observation unit 110 and label data acquired by the label data acquisition unit 115 from the manufacturing machine 70, the learning unit 140 performs machine learning using a learning model (selected by model data selection unit 130) suitable for an ambient temperature change curve of the manufacturing machine 70. For example, machine learning performed by the learning unit 140 may be so-called supervised learning with a pair of a state variable and label data as training data. Also, a known learning model such as an inference equation or a neural network may be used as a learning model used for machine learning by the learning unit 140, and a known learning algorithm may be employed as a learning algorithm thereof.

The model data storage unit 150 stores a learned model of the manufacturing machine 70, machine learning of which is performed by the learning unit 140, into the learned model storage unit 200 in association with an ambient temperature change curve of the manufacturing machine 70. The model data storage unit 150 stores an ambient temperature change curve, which indicates a transition of a change in ambient temperature of the manufacturing machine 70 and which is observed by the ambient temperature change curve observation unit 120, and a learned model for learning and inference of the manufacturing machine 70 into the learned model storage unit 200. The model data storage unit 150 may store, as a learned model, a learning model learning of which is over among learning models machine learning of which is performed by the learning unit 140 into the learned model storage unit 200. Here, determination that learning is over may be made by a known determination method or determination that learning is over may be made in a case where a worker operates the input device 40 and instructs that learning is over.

Based on a state variable observed from the manufacturing machine 70 by the state observation unit 110, the estimation result outputting unit 160 estimates a thermal displacement compensation amount of the manufacturing machine 70 by using a learned model for the manufacturing machine 70 which model is learned by the learning unit 140, and outputs the estimated thermal displacement compensation amount of the manufacturing machine 70. The estimation of the thermal displacement compensation amount of the manufacturing machine 70 which estimation is output by the estimation result outputting unit 160 is transmitted to the manufacturing machine 70 and is used for thermal displacement compensation. Also, the estimation of the thermal displacement compensation amount of the manufacturing machine 70 which estimation is output by the estimation result outputting unit 160 may be displayed on the display device 50, for example.

In the above, an embodiment of the present invention has been described. However, the present invention is not specifically limited to an example of the above-described embodiment and can be performed in various modes with an arbitrary change.

For example, in the above-described embodiment, an example of mounting the thermal displacement compensation device 1 on a host computer has been described. However, for example, a thermal displacement compensation device 1 may be mounted on a control device that controls a manufacturing machine 70.

Also, in the above-described embodiment, a configuration in which the learned model storage unit 200 is included in an internal part of the machine learning device 100 has been described. However, a learned model storage unit 200 may be arranged in any place as long as being referable by a machine learning device 100. For example, it is considered to arrange a learned model storage unit 200 on a host computer or a cloud computer and to arrange a machine learning device 100 on each manufacturing machine 70. In such a case, since a plurality of machine learning devices 100 can share the learned model storage unit 200, a learned model can be collected from each machine learning device 100 and collecting efficiency of a learned model is improved.

Moreover, in the above-described embodiment, the embodiment of a case where the learning unit 140 performs supervised learning has been described. However, as long as learning of a thermal displacement compensation can be performed, a different machine learning method such as reinforcement learning may be employed. For example, in a case where reinforcement learning is performed, it is possible to configure that a state of a working operation of each manufacturing machine 70 and a thermal displacement compensation amount set with respect to each axis in the manufacturing machine 70 are observed by a state observation unit 110 and that a function unit to acquire rightness/wrongness of the thermal displacement compensation amount as determination data is provided. In such a manner, a label data acquisition unit 115 or the like is not an essential configuration. As long as a configuration is made in such a manner that information that becomes necessary according to a way of learning implemented in a learning unit 140 can be acquired from a manufacturing machine 70, a problem related to machine learning is not generated. Note that a point of the present invention is that a learned model suitable for being used in machine learning and estimation can be selected based on an ambient temperature change curve indicating an environment around a manufacturing machine 70.

In the above, embodiments of the present invention have been described. However, the present invention is not limited to examples of the above-described embodiments and may be performed in a different mode with an arbitrary change.

The invention claimed is:

1. A thermal displacement compensation device that estimates a thermal displacement compensation amount in each axis included in a manufacturing machine, the thermal displacement compensation device comprising:
   a machine learning device that learns a thermal displacement compensation amount in each axis included in the manufacturing machine with respect to an operation state of the manufacturing machine,
   wherein the machine learning device includes
   a model data selection unit that selects, under a change in ambient temperature of the manufacturing machine, a learned model suitable for additional learning of the thermal displacement compensation amount in each axis included in the manufacturing machine with respect to the operation state of the manufacturing machine, and
   a learned model storage unit that associates and stores a pattern of an ambient temperature change curve indicating a transition of the change in the ambient temperature of the manufacturing machine, and a learned model that is learned under the change in the ambient temperature, and
   the model data selection unit selects the learned model suitable for the additional learning of the thermal displacement compensation amount in each axis included in the manufacturing machine with respect to the operation state of the manufacturing machine based on the ambient temperature change curve stored in the learned model storage unit.

2. The thermal displacement compensation device according to claim 1,
   wherein the model data selection unit displays a list of the ambient temperature change curve stored in the learned model storage unit, and selects a learned model, which is associated to an ambient temperature change curve selected from the displayed ambient temperature change curve, as the learned model suitable for the additional learning of the thermal displacement compensation amount in each axis included in the manufacturing machine with respect to the operation state of the manufacturing machine.

3. The thermal displacement compensation device according to claim 1, wherein the machine learning device further includes an ambient temperature change curve observation unit that acquires a change in the ambient temperature of the manufacturing machine, and the model data selection unit searches the learned model storage unit for an ambient temperature change curve similar to the change in the ambient temperature of the manufacturing machine which change is observed by the ambient temperature change curve observation unit, and selects a learned model associated to the found ambient temperature change curve as a learned model suitable for the additional learning of the thermal displacement compensation amount in each axis included in the manufacturing machine with respect to the operation state of the manufacturing machine.

* * * * *